(No Model.) 3 Sheets—Sheet 1.
P. GLEICH & H. S. KRAUSE.
HOSE COUPLING.
No. 373,825. Patented Nov. 29, 1887.
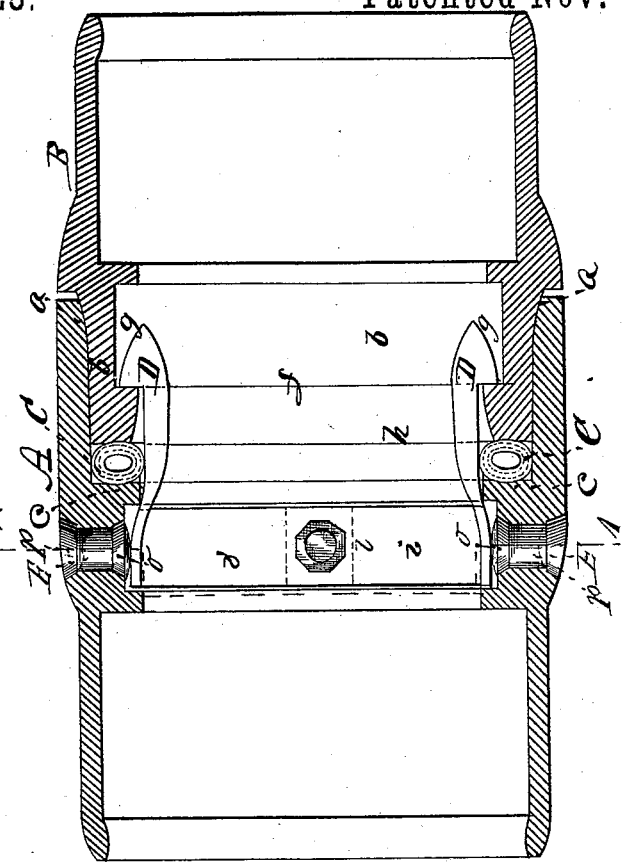
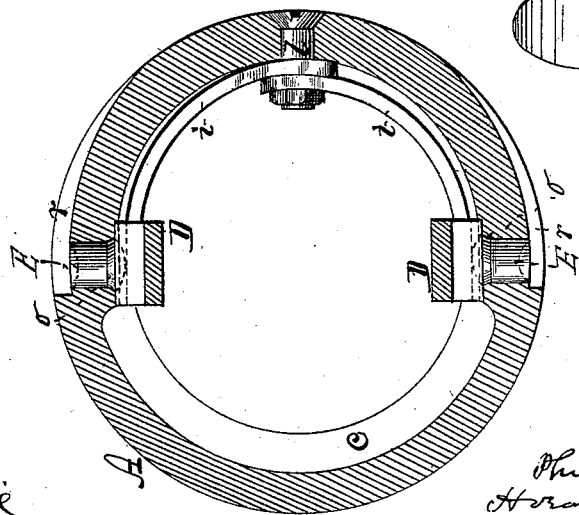
Witnesses
Inventors
Philip Gleich
Horatio S. Krause
By their Attorneys (No Model.) 3 Sheets—Sheet 2.
P. GLEICH & H. S. KRAUSE.
HOSE COUPLING.
No. 373,825. Patented Nov. 29, 1887.
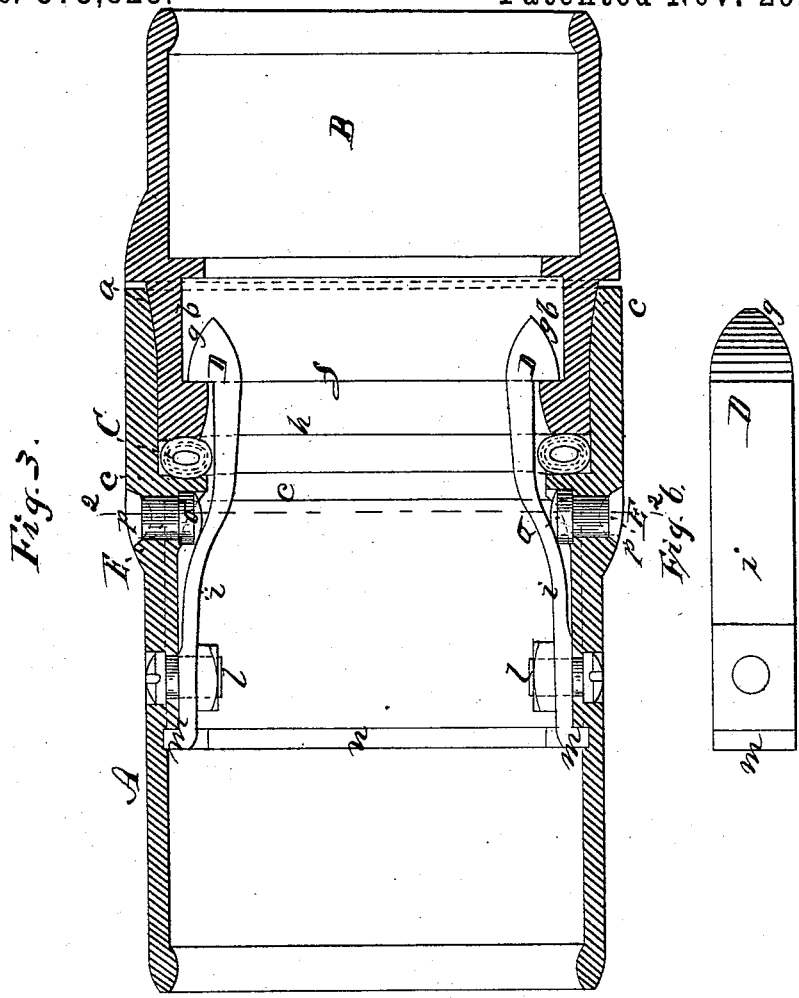
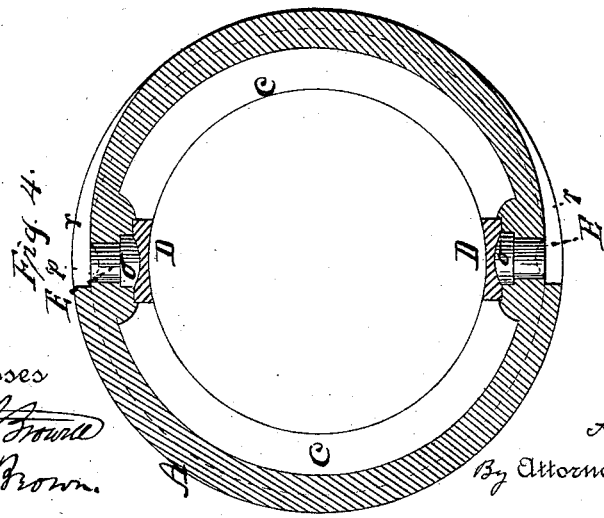
Witnesses
Arthur H Brown
J. S. Brown.
Inventors
Philip Gleich,
Horatio S. Krause,
By Attorneys,
Louis Leroy &c.
N. PETERS, Photo-Lithographer, Washington, D. C.

(No Model.) 3 Sheets—Sheet 3.
P. GLEICH & H. S. KRAUSE.
HOSE COUPLING.
No. 373,825. Patented Nov. 29, 1887.
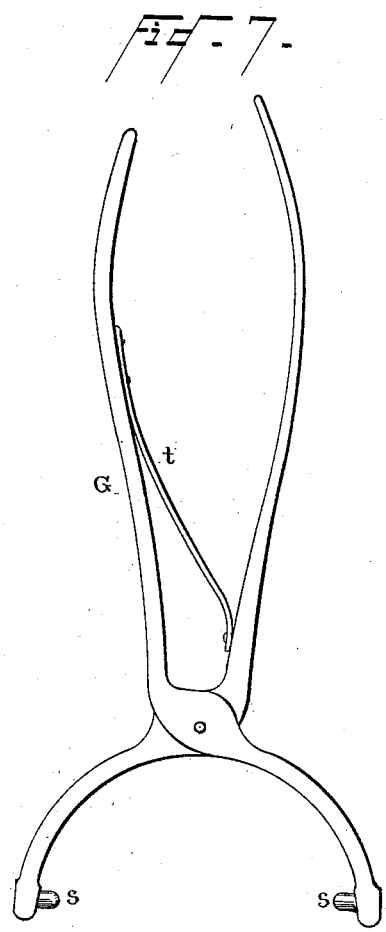
WITNESSES
Norris A. Clark
Arthur D. Browne
INVENTOR
Philip Gleich
Horatio S. Krause,
By their attorneys
Louis Feeser &Co

UNITED STATES PATENT OFFICE.

PHILIP GLEICH AND HORATIO SEYMOUR KRAUSE, OF ST. PAUL, MINNESOTA.

HOSE-COUPLING.

SPECIFICATION forming part of Letters Patent No. 373,825, dated November 29, 1887.

Application filed February 12, 1886. Serial No. 191,723. (No model.)

*To all whom it may concern:*

Be it known that we, PHILIP GLEICH and HORATIO SEYMOUR KRAUSE, of St. Paul, in the county of Ramsey and State of Minnesota, have invented new and useful Improvements in Hose-Couplings; and we do hereby declare that the following is a full and exact description thereof, reference being had to the accompanying drawings, making part of this specification.

Figure 1 of the drawings represents a longitudinal axial section of our improved hose-coupling constructed in the form preferred by us; Fig. 2, a transverse section of the same in a plane indicated by the line 1 1, Fig. 1; Fig. 3, a longitudinal axial section of a modified form of the improved hose-coupling; Fig. 4, a transverse section of the same in a plane indicated by the line 2 2, Fig. 3; Fig. 5, a side view of the coupling spring or springs used in the construction shown in Figs. 1 and 2; Fig. 6, a side view of one of the coupling-springs used in the modified construction shown in Figs. 3 and 4; Fig. 7, a view of the "tongs" or instrument employed in uncoupling the hose provided for our improved coupling.

Like letters designate corresponding parts in all of the figures.

Our invention consists in the features of improvement hereinafter specified, whereby a perfectly-tight joint is made at all times and the coupling is free from projections on the outer surface, the inner surface does not obstruct the water in its passage through the coupling, by which the connection and disconnection of the two parts of the coupling are made with great facility under all circumstances.

In the drawings, A represents the female part or shell of the coupling, and B the male part or shell.

The female part or shell A has its mouth *a* preferably somewhat flaring, and the coupling end *b* of the male part or shell B is correspondingly tapered or conical, to fit the said mouth of the female shell; and when the parts are coupled these flared and tapered parts fit sufficiently tight to make a close coupling. By this construction one part is always easily fitted into the other part with perfect ease and with no liability of any obstruction at any time in coupling hose.

At the throat or bottom of the mouth of the female shell is formed an inwardly-projecting ledge or shoulder, *c*, of sufficient width for a packing ring or gasket, C, to rest upon. This ledge is preferably coved, as shown in the drawings, in order that the packing-ring may not be forced from its seat by the pressure of the water, and the inner end of the male shell is also coved for the same purpose. The packing-ring C is best made of a hollow ring of india-rubber or equivalent material, though it may operate very well if otherwise made; but this construction of the gasket allows more variation in the tightness of the coupling, while completely packing the joint against leakage. It thus facilitates the use of the spring catch-hooks employed by us for fastening the shells together, which we now proceed to describe.

We ordinarily employ two catch-hooks, D D, secured to the inner side of the female shell and adapted to catch over an abrupt shoulder, *f*, on the inner surface of the male shell near its mouth or outer end, as shown. These catch-hooks are spring-hooks, so as to automatically yield inward when the male shell is inserted, and then spring outward and catch upon the catch-shoulder of the male shell, the freely-yielding packing-ring C allowing the male shell to readily enter far enough to allow the catch-hooks to freely take hold upon its catch-shoulder, and then expanding to make a constantly water-tight joint. The outer points, *g g*, of the catch-hooks are wedge-formed or chamfered, to enable them to slide inside of the male shell and be compressed toward each other, and the inner edge, *h*, of the end of the male shell is also preferably chamfered or flared auxiliary to the same purpose.

To give spring action to the catch-hooks D D, we make them elastic; and in order to give sufficient length thereto for possessing sufficient elastic movement for the purpose, we have devised two constructions acting on the same principle. The first and preferable construction is shown in Figs. 1 and 2. Here the hooks proper are placed lengthwise of the coupling or parallel with its axis, while to give sufficient length to its leaf or spring part $i$ it is turned at right angles to the hook part and bent in the form of the arc of a circle, so that it will fit into an annular groove or recess in the shell in order not to obstruct the water-passage, and so that sufficient strength may be given to the hold of the hook by the shouldered edge of the said groove. This arc-shaped part may extend as far around the periphery of the coupling as convenient or desired. We find it to be sufficient to give it a little more than a quarter of a circle, since the two hooks are best placed opposite to each other, and we find it an improvement to have the spring parts of the two hooks meet, lap a little one over the other, as shown in Fig. 2, and to secure them both to the shell by a single screw, $l$. This whole construction and arrangement of the catch-hooks enables us to apply them without requiring any undue lengthening of the coupling-shell. They do not obstruct the water-passage in the least, except to the extent of the very small space which the cross-sections of the hooks occupy, and the coupling is made large enough to have as great a capacity as the hose.

In Figs. 3 and 4 a modified construction of the catch-hooks is shown. Here the entire length of the hook and spring part of the catch extends lengthwise of the coupling and parallel with its axis. The heel $m$ of each catch-hook takes into an annular groove, $n$, in the inner surface of the shell, thus keeping the catch-hook securely in its proper position and taking a part of the strain of the draft on the hook. This coupling is good; but it requires a longer female shell than the construction first described, so that the coupling is made somewhat heavier and less compact thereby.

We have invented a device for bending in the spring catch-hooks D D which is perfectly effective, very simple, requires no outside projections on the coupling, and whereby firemen can in the coldest weather easily and quickly uncouple the hose. Between each catch-hook and the shell to which it is attached is placed a push or tracker pin, E. Its head $o$ is on the inner end thereof, and the spring-catch presses outward against it, causing the shoulder of the head to pack close over and prevent leakage through the hole $p$ in the shell wherein the pin is located. The pin does not reach entirely through the thickness of the shell, and outside of its outer end the hole is properly somewhat flared, as shown in Figs. 3 and 4. Peripheral grooves $r\ r$ are sunk into the outer surface of the shell, leading into the two pin-holes, as shown in Fig. 4. These grooves and flaring entrance to the pin-hole are for the purpose of easily guiding into and retaining in the holes the finger points or bits of an instrument, G, Fig. 7, which we have called "tongs," for use in uncoupling the hose. It has handles like tongs or pinchers, and finger points or bits $s\ s$, pointing inward toward each other from the extremities of the two jaws of the tongs. These finger-points fit into the pin-holes and against the ends of the push-pins, which may be slightly concave for receiving the fingers thereon. A spring or springs, $t$, of sufficient strength for the purpose, will force the jaws of the tongs inward as soon as the finger-points are introduced into the pin-holes of the coupling, and bend the catch-hooks inward far enough to detach them from the catch shoulder of the male shell and uncouple the hose. On compressing the handles of the tongs toward each other with the hand the instrument may be then withdrawn from the coupling-shell.

We claim as our invention—

1. In combination with the coupling-shells of a hose-coupling, catch-hooks D D, having their opening portions or leaves formed in substantially the arc of a circle and fitting in an annular groove in the interior surface of one of the coupling-shells, substantially as and for the purpose herein specified.

2. The tongs herein described, having spring-handles and forcep-jaws, the latter furnished with rigid and inwardly-projecting studs or bits, in combination with the hose-coupling herein described, having the guide-grooves and concealed push-pins, substantially as and for the purpose herein specified.

3. The combination of the shell A, having outwardly-springing catch-hooks D D on the inside, holes $p\ p$ through the sides thereof, and outside peripheral grooves, $r\ r$, leading to the said holes of the shell, push-pins E E in the holes of the shell, and tongs G, having inwardly-projecting studs or bits $s\ s$ and adapted to be led to the said push-pins by the said peripheral grooves, substantially as and for the purpose herein specified.

In testimony whereof we have hereunto set our hands in presence of two subscribing witnesses.

PHILIP GLEICH.
HORATIO SEYMOUR KRAUSE.

Witnesses:
LOUIS FEESER, Jr.,
HENRY E. RANDALL.